US012748661B2

(12) United States Patent
Gonzales et al.

(10) Patent No.: US 12,748,661 B2
(45) Date of Patent: Sep. 29, 2026

(54) TRACKING LATCH UPSET EVENTS USING A TRIM REGISTER

(71) Applicant: Micron Technology, Inc., Boise, ID (US)

(72) Inventors: John M. Gonzales, Boise, ID (US); Christopher G. Wieduwilt, Boise, ID (US); Seth A. Eichmeyer, Boise, ID (US); Matthew D. Jenkinson, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 18/778,645

(22) Filed: Jul. 19, 2024

(65) Prior Publication Data

US 2025/0061020 A1 Feb. 20, 2025

Related U.S. Application Data

(60) Provisional application No. 63/519,586, filed on Aug. 15, 2023.

(51) Int. Cl.
*G06F 11/10* (2006.01)
*G06F 11/07* (2006.01)

(52) U.S. Cl.
CPC ...... *G06F 11/1068* (2013.01); *G06F 11/0772* (2013.01)

(58) Field of Classification Search
CPC ............. G06F 11/0772; G06F 11/1004; G06F 11/1068; G11C 29/42
USPC ........................................................ 714/764
See application file for complete search history.

(56) References Cited

U.S. PATENT DOCUMENTS

| | | | | |
|---|---|---|---|---|
| 11,740,987 | B2 * | 8/2023 | Siciliani | G06F 11/0751 714/764 |
| 11,948,655 | B2 | 4/2024 | Eichmeyer et al. | |
| 2015/0333773 | A1 * | 11/2015 | Fillingim | G06F 11/1068 714/764 |
| 2016/0070496 | A1 * | 3/2016 | Cohen | G06F 3/0644 711/103 |
| 2020/0210105 | A1 * | 7/2020 | Rori | G11C 29/52 |
| 2021/0304009 | A1 * | 9/2021 | Bazarsky | G06N 3/06 |
| 2023/0315918 | A1 | 10/2023 | Eichmeyer et al. | |

* cited by examiner

*Primary Examiner* — Albert Decady
*Assistant Examiner* — Enam Ahmed
(74) *Attorney, Agent, or Firm* — Brooks, Cameron & Huebsch, PLLC

(57) ABSTRACT

Apparatuses, systems, and methods for tracking latch upset events using a trim register are described. An example method includes reading trim data from trim registers in a non-volatile memory device. The example method can further include generating parity data for the trim data. The example method can further include storing the parity data in the trim registers. The example method can further include, subsequent to the generation and storage of the parity data, re-reading the trim data from the trim registers, generating additional parity data, and comparing the parity data to the additional parity data.

16 Claims, 6 Drawing Sheets

TRACKING LATCH UPSET EVENTS USING A TRIM REGISTER

PRIORITY INFORMATION

This application claims the benefit of U.S. Provisional Application No. 63/519,586, filed on Aug. 15, 2023, the contents of which are incorporated herein by reference.

TECHNICAL FIELD

Embodiments of the disclosure relate generally to semiconductor memory apparatuses, systems, and methods, and, more particularly, to apparatuses, systems, and methods related to tracking latch upset events using a trim register.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
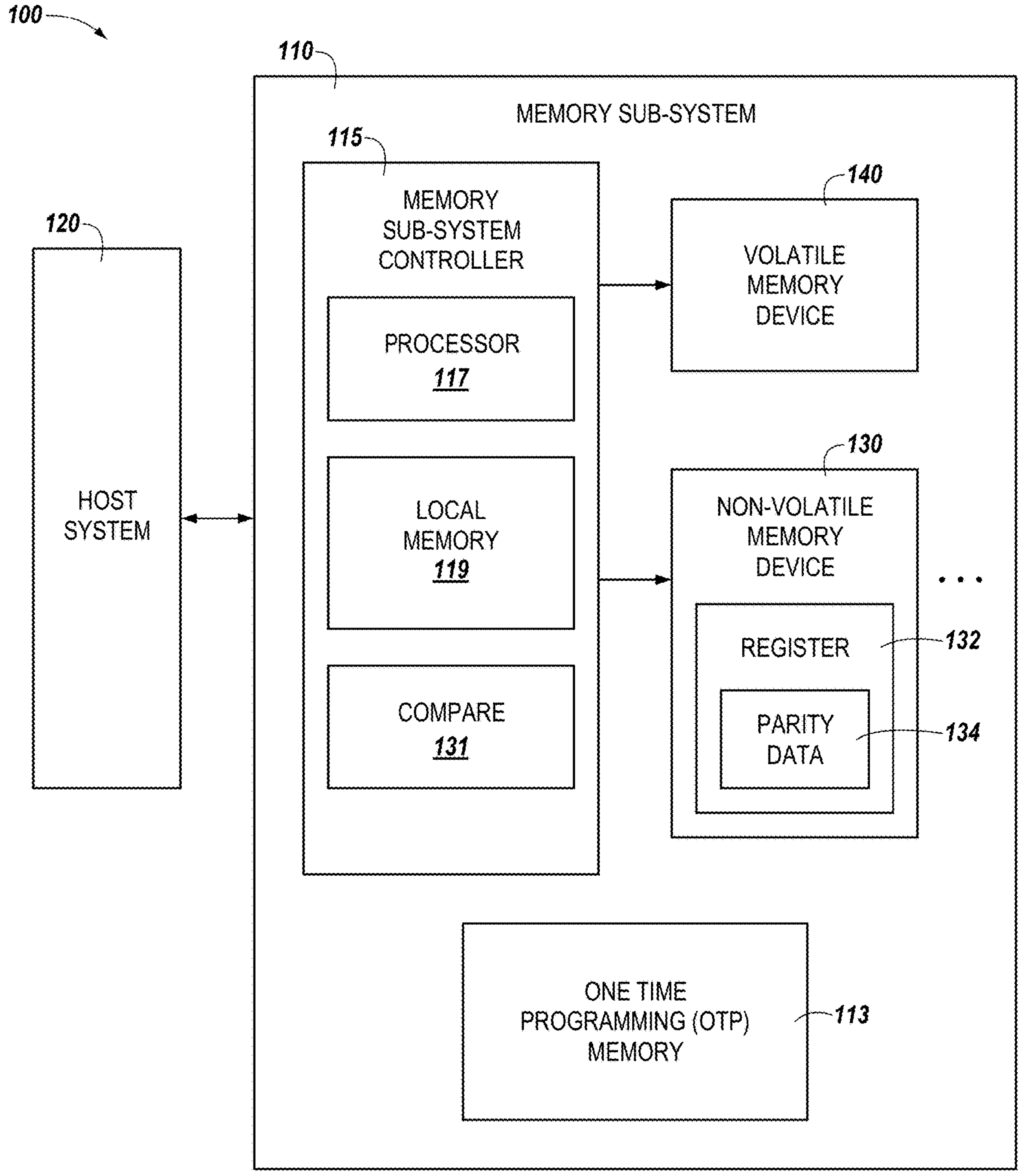
FIG. 1 illustrates an example computing environment that includes a memory sub-system in accordance with some embodiments of the present disclosure.

Apparatuses, systems, and methods for tracking latch upset events using a trim register are described. A memory device can be a non-volatile memory device. One example of a non-volatile memory device is a flash memory system. Other examples of non-volatile memory devices are described below in conjunction with FIG. 1. A memory device can include a physical block of memory cells (e.g., a collection of data). The memory device can be coupled to a controller within a memory sub-system.

A memory sub-system can be a storage system, storage device, a memory module, or a combination of such. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory operation (e.g., a read, write, or other memory operation) can be initiated to read data from and/or write data to store data in a memory device of the memory sub-system. A controller of the memory sub-system can access a trim register(s) stored within a memory device. The trim register(s) can store trim data. Trim data refers to data stored in a trim register while trim registers are registers in the memory device that store factory settings that govern the operation of the device. A portion of trim data can be used to indicate which blocks of data in the memory device are no longer considered to be "in use" and therefore can be erased internally. Trim data can enable the memory device to handle garbage collection, voltage level settings, timing settings, feature enable settings, redundancy settings, and address mapping, and other such operations, which may otherwise slow down subsequent write operations to the associated blocks more efficiently. In some instances, a latch upset event can introduce errors into the trim data in the trim register(s) in the memory device (e.g., the latch upset event can cause a bit of the trim data to flip or be changed and therefore become inaccurate). As an example, trim data used to indicate which blocks are no longer in use (or, in the alternative, which blocks are in use and should not be erased) can be incorrectly flipped by the latch upset event, causing a block that may still be in use to be indicated as not in use or, vice versa, cause a block that may no longer be in use to be indicated as in use. Such mislabeling can incorrectly allow erasing of a block that should be prevented from being erased or incorrectly prevent a block from being erased that should be erased, thereby reducing the efficient use of the memory blocks and decreasing performance of the memory device. Further, such mislabeling can allow and/or prevent access to blocks in the memory device that should or should not be otherwise allowed or prevented and expend additional memory resources to correct the errors or use the blocks in such a way that should not occur.

Aspects of the present disclosure address the above deficiencies by generating parity data using the trim data stored in the trim register(s). The parity data may be a cyclic redundancy check (CRC). A cyclic redundancy check (CRC) refers to an error-detecting code commonly used in digital networks and storage devices to detect accidental changes to raw data. However, embodiments are not so limited and other error detection methods may be used. Blocks of data entering these systems can get a short check value attached, based on a remainder of a polynomial division of their contents. On retrieval, the calculation can be repeated and, in the event the check values do not match, corrective action can be taken against the data corruption. For example, a first set of parity data generated using the trim data can be the same data (e.g., be data that matches) as a second set of parity data subsequently generated using the trim data (which may have changed due to latch upset evens and/or an occurrence of other events). Likewise, the first set of parity generated using the trim data may be different data (e.g., data that does not match) as the second set of parity data subsequently generated due to the trim data changing over time or being affected by latch upset events.

CRCs can be used in error correction systems to detect errors. Further, CRCs can be so-called because the check (data verification) value is a redundancy (it expands the message without adding information) and can be based on cyclic codes. CRCs can be used because they are simple to implement in binary hardware, easy to analyze, and particularly good at detecting common errors cause by noise in transmission channels. Because the check value has a fixed length, the function that generates can be used as a hash function. The generated parity data from the trim data can be stored within the trim register(s) and/or in additional memory locations. During operation of the memory device, subsequent parity data values can be generated from the currently stored trim data (e.g., during a CRC data check), thereby tracking whether the trim data has been changed or modified. The changing or modifying of the trim data can be due to the previously mentioned latch upset events. Therefore, the parity data checks can be tracking the occurrence of latch upset events. In another example, the parity data can be generated using both static trim data stored in static trim register(s) and dynamic trim data stored in dynamic trim register(s). While providing better coverage using the parity data, the parity data may be updated in response to the dynamic trim data being changed.

In an example, aspects of the present disclosure can address the above deficiencies by tracking the latch upset events by comparing the trim data in the trim register(s) to trim data stored in a one-time programmable (OTP) memory. In this way, a difference (e.g., a mismatch or non-match) in the trim data in the trim register(s) from the trim data stored in the (OTP) memory can indicate a latch upset event has occurred. In order to correct a latch upset event, the controller can cause trim data stored in a OTP memory to be transferred to the trim register(s) of the memory device to correct the error in the trim data of the trim register(s). A latch upset event can be caused by a neutron strike. As used herein, the term "neutron strike" refers to the interaction between one or more neutrons and a component of the memory device. The component can include, but is not limited to, an array of memory cells, latches, and logic circuitry. The errors can include, but are not limited to, changing the memory address stored in a latch or flipping a data bit. A processor on or coupled to the memory device can include error correction code (ECC) circuitry to correct the errors. However, if the number of errors exceeds the ability of the ECC circuitry to correct the errors, the memory device may function improperly.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130). In other embodiments, the memory sub-system 110 can include volatile memory devices (e.g., memory device 140) and/or a combination of volatile memory devices and non-volatile memory devices.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130, 140) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM). Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The memory device 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory device 130 can be grouped as pages that can refer to a logical unit of the memory device used to store data. With some types of memory (e.g., NAND), pages can be grouped to form blocks.

The memory device 130 can include a trim register ("REGISTER") 132. The trim register 132 can store factory settings that govern the operation of the device. Data stored within the trim register can be referred to as trim data. Examples include but are not limited to voltage level settings, timing settings, feature enable settings, redundancy settings, and address mapping. The trim data stored in the trim register 132 can indicate whether a block in the memory device, 130, 140 is in use and therefore whether to allow the block to be erased. The trim register 132 can store trim data that was transferred or written from a block in the memory device 130 and/or stored in the trim register 132 by the sub-system controller 115. In some examples, the trim data stored in the trim register 132 is the same as the trim data stored in the OTP 113. In some examples, the trim data stored in the trim register 132 has been corrupted or has experienced a latch upset event, as described herein. The latch upset event can cause the trim data stored in the trim register 132 to be corrupted or to flip a bit of the trim data or store data different than the trim data stored in the OTP 113. The OTP memory 113 can store trim data that does not change and/or that is not corruptible. In response to the trim data in the trim register 132 being different than the trim data in the OTP 113, trim data stored in the OTP memory 113 can be loaded into the trim register 132 to remedy the error that was introduced by the latch upset event.

The trim register 132 of the memory device 130 can include parity data 134. The parity data 134 can be generated using the trim data stored in another location of the trim register 132. For example, the trim data in the trim register 132 can be used to generate parity data. In some examples, the parity data 134 can be generated using static trim registers storing static trim data and dynamic trim registers using dynamic trim data. In this way, broader coverage of the parity data protection can be performed. However, the parity data 134, in this example, may be updated whenever the dynamic trim data is changed or updated.

The parity data 134 can be stored in the trim register 132 in order to be compared during subsequent parity checks performed on the trim data. For example, the trim data stored in the trim register 132 can be used to generate subsequent parity data values and the subsequently generated parity data values can be compared to the parity data 134. In response to the parity data 134 matching the subsequently generated parity data values (e.g., being the same parity data as previously generated), a determination that the trim data has not changed or has not experienced a latch upset event can be made. Further, in response to the parity data 134 not matching the subsequently generated parity data values, a determination that the trim data has changed or has experience a latch upset event can be made.

Although non-volatile memory components such as NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

In some embodiments, the memory sub-system 110 includes at least a portion of the OTP memory 113. For example, the memory sub-system controller 115 can communicate with the OTP memory 113 portion within the memory sub-system 110 to perform the operations described herein. Trim data can be stored in the OTP memory 113. A portion of trim data can be used to indicate whether a particular block of memory in the memory device 130, 140 is in use and therefore should be prevented from being erased or is not in use and therefore can be erased without causing problems with the memory operation of the memory device 130, 140.

The memory sub-system controller 115 (or controller 115 for simplicity) can communicate with the memory devices 130, 140 to perform operations such as reading data, writing (e.g., program) data, or erasing data at the memory devices 130, 140 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. For example, the processor 117 (e.g., processing device) can be configured to execute instructions stored in local memory 119 for performing the operations described herein to read and/or write to the blocks of memory within the memory device 130 and/or read from the OTP 113.

The memory sub-system controller 115 can include a compare component 131. The compare component 131 can include hardware, firmware, and/or circuitry used to compare parity data to subsequently generated parity data. The compare component 131 can compare the initially generated parity data 134 and subsequently generated parity data during particular time intervals or time periods in order to perform parity checks on the trim data at regular intervals of time.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130, 140. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller for media management within the same memory device package. An example of a managed memory device is a managed NAND (MNAND) device.

The non-volatile memory device 130 can store a plurality of physical blocks of memory cells (e.g., a collection of data). The plurality of physical blocks can be indicated as in use or not in use within trim data in order to track which blocks of the plurality of physical blocks can be erased or which should be prevented from being erased. The trim data can be stored within the OTP memory device 113 within the non-volatile memory device 130 using latches. For example, the OTP memory device 113 can include one or more latches that are configured to store the trim data. Although not shown in FIG. 1 so as to not obfuscate the drawings, the OTP memory device 113 can include various circuitry to facilitate data storage. For example, the OTP memory device 113 can include special purpose circuitry in the form of an ASIC, FPGA, state machine, and/or other logic circuitry that can allow the OTP memory device 113 to store the trim data.

The stored trim data within the OTP memory device 113 can be compared to the trim data stored in the trim register 132 of the memory device 130. In some examples, the comparison of trim data in the trim register 132 to trim data in the OTP 113 can occur at particular time intervals or time periods and/or can be coordinated or tied to particular memory operations or cyclical operations associated with erasing blocks of memory or garbage collection operations. Further, the comparison can occur at particular time intervals or time periods thereby tracking the occurrence of latch upset events in a repeating pattern. In the event that the comparison of trim data in the OTP 113 with trim data in the trim register 132 in the memory device 130 determines a match, the trim data in the memory device 130 can be considered valid (and thereby not need to be loaded or written over by the trim data in the OTP 113). Likewise, in the event that the comparison does not determine a match, the trim data can be considered invalid and the trim data stored in the memory device can be written over by the trim data in the OTP 113.

Figure 2:
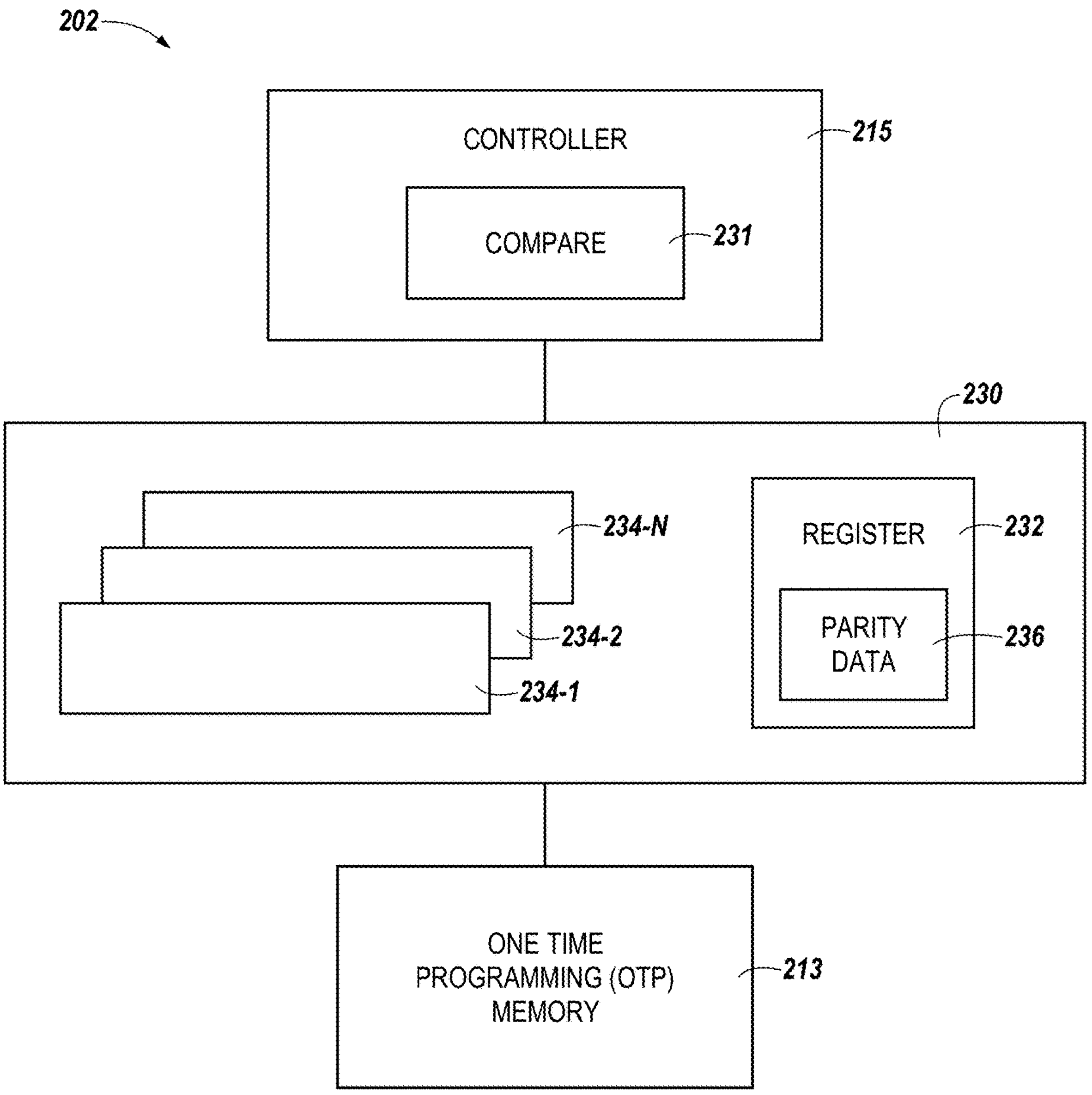
FIG. 2 is an example memory system for tracking latch upset events using a trim register in accordance with some embodiments of the present disclosure.

FIG. 2 is an example memory system 202 for tracking latch upset events using a trim register in accordance with some embodiments of the present disclosure. The example memory system 202 can include a memory sub-system controller 215. The memory sub-system controller 215 can monitor memory blocks 234-1, 234-2, . . . , 234-N (hereinafter referred to collectively as memory blocks 234) within the non-volatile memory device 230 and provide input for the trim data, indicating whether any of the memory blocks 234 are in use or not. The trim data can be stored within an OTP memory device 213 (e.g., analogous to the OTP memory device 113 illustrated in FIG. 1) and/or within a trim register 232 of the memory device 230. Although only one portion of blocks of memory cells is illustrated, embodiments are not so limited and an unlimited amount of portions of blocks of memory may be within the non-volatile memory device, whose associated trim data can be stored partially or entirely within the OTP memory device 213. The trim data can indicate whether a particular memory block is in use for purposes of erasure and/or garbage collection. For example, the trim data can indicate whether a block can be read, erased, programmed or written to without generating or inserting errors (e.g., without incurring an amount of errors that exceeds an error correction capability associated with the OTP memory device 213).

A latch upset event can be defined as an occurrence that causes a latch to become inadvertently enabled. For example, the latch upset event can flip a latch of the trim data within the memory device 230. A latch upset event can prevent the controller 215 from accessing data within the particular block due to the trim data being inaccurate or no longer valid. For example, a block that is in use and should not be erased could be erased if the trim data incorrectly indicates the block is not in use, and vice versa.

The controller 215 can include a compare component 231 (e.g., analogous to compare component 131 in FIG. 1). The compare component 231 can be used to compare trim data stored in the trim register 232 of the memory device 230 to trim data stored in the OTP memory device 213. In this way, whether the trim data has changed from the first time point to the second time point can be determined. In this way, the trim data in the trim register 232 can be verified to be correct or incorrect and/or the occurrence of a latch upset event can be determined. Further, the compare component 231 can be used to compare parity data 236 previously generated with trim data at a first time point to parity data values subsequently generated using the current trim data at a second time point.

A comparison of the trim data and/or the parity data 236 can indicate that a latch upset event occurred. For example, when there is a difference between the trim data in the trim register 232 and the trim data in the OTP 113, or the parity data at a first time point and the parity data at a second time point, a determination that an error has occurred can be made. In one example, a latch upset event can be caused by silicon particles colliding with neutrons (e.g., referred to as a neutron strike) of a latch within the memory device 230. The silicon particle can attract a charge and change the data within the latch. In another example, a latch upset event can be caused by alpha particles colliding with neutrons of the latch. But embodiments are not so limited, any occurrence that causes a collision with neutrons of the latch can cause a latch upset event. In response to the comparison of the trim data or parity data being different values, a flag can be set by the controller 215. Further, a reloading or a writing over of the trim data in the trim register 232 of the memory device 230 can be performed by transferring the trim data in the OTP memory device 213 to the trim register 232.

Figure 3:
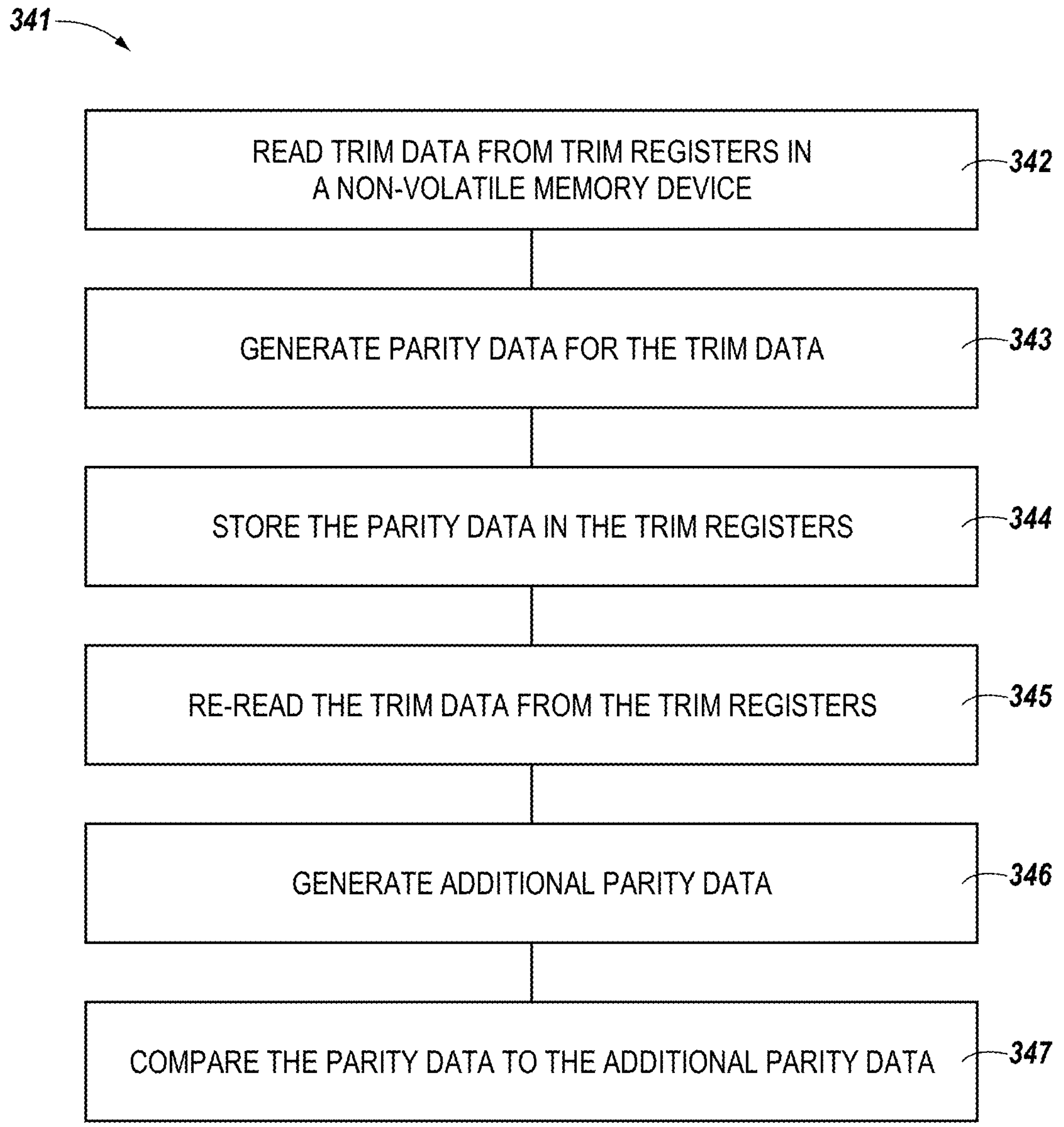
FIG. 3 is a flow diagram of an example method for tracking latch upset events using a trim register in accordance with some embodiments of the present disclosure.

FIG. 3 is a flow diagram of an example method 341 corresponding to tracking latch upset events using a trim register in accordance with some embodiments of the present disclosure. The method 341 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 341 can be performed by the memory sub-system controller 115 and 215 of FIGS. 1-2 respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 342, the method 341 includes reading trim data from trim registers in a non-volatile memory device. The trim registers can be analogous to trim register 132 and 232 in FIGS. 1-2. The non-volatile memory device can be analogous to memory device 130 and 230 in FIGS. 1-2. Trim data refers to data used to indicate which blocks of data in the memory device are no longer considered to be "in use" and therefore can be erased internally. Trim data enables the memory device to more efficiently handle garbage collection, and other such operations, which may otherwise slow down subsequent write operations to the associated blocks.

In some instances, a latch upset event can introduce errors into the trim data in the trim register(s) in the memory device (e.g., the latch upset event can cause a bit of the trim data to flip or be changed and therefore become inaccurate).

At operation 343, the method 341 includes generating parity data for the trim data. Blocks of data for the parity data can get a short check value attached, based on a remainder of a polynomial division of their contents. On retrieval, the calculation can be repeated and, in the event the check values do not match, corrective action can be taken against the data corruption. Parity data can be used in error correction systems to detect errors.

At operation 344, the method 341 includes storing the parity data in the trim registers. As an example, the parity data can be stored in a portion of the trim registers that is different than a portion where the trim data is stored. In this way, the parity data can be stored in a similar location as the trim data that the parity data is protecting. At operation 345, the method 341 includes re-reading the trim data from the trim registers. The trim data can be re-read at a point in time or time period later than when the trim data was initially read to generate the parity data. As an example, the trim data can be read at a first time point and the initial parity can be generated from the trim data read at the first time point. The trim data can be re-read or read again at a second time point later than the first time point.

At operation 346, the method 341 includes generating additional parity data. The additional parity data can be generated from the trim data re-read or read again at the second time point. At operation 347, the method 341 includes comparing the parity data to the additional parity data. As an example, parity data stored in the trim register can be compared to additional parity data generated from reading the trim data again or at a later point in time. In this way, the parity data in the trim register can be compared to the additional parity data to determine whether a latch upset event has occurred and/or determine whether to reload trim data from a trusted location (e.g., from an OTP memory that stores trim data that may not change) or error correct the trim data, if possible.

In some example methods, the trim data can be determined to be valid in response to the parity data matching the additional parity data. In some example methods, the trim data can be determined to be invalid in response to the parity data being different than the additional parity data. In some example methods, a determination that a latch upset event has affected the trim data can be made in response to the parity data being different than the additional parity data. In some example methods, valid trim data can be reinitialized to the trim registers in response to the parity data being different than the additional parity data. In some example methods, a flag can be set (e.g., a bit can be flipped to indicate a latch upset event has occurred) indicating a latch upset event has occurred in the trim registers in response to the parity data being different than the additional parity data. In some examples, the set flag can be sent to an external device. The external device can be host and/or a user. In some examples, determining that a latch upset event has occurred can include determining that a neutron strike has occurred on the trim data in the trim register.

Figure 4:
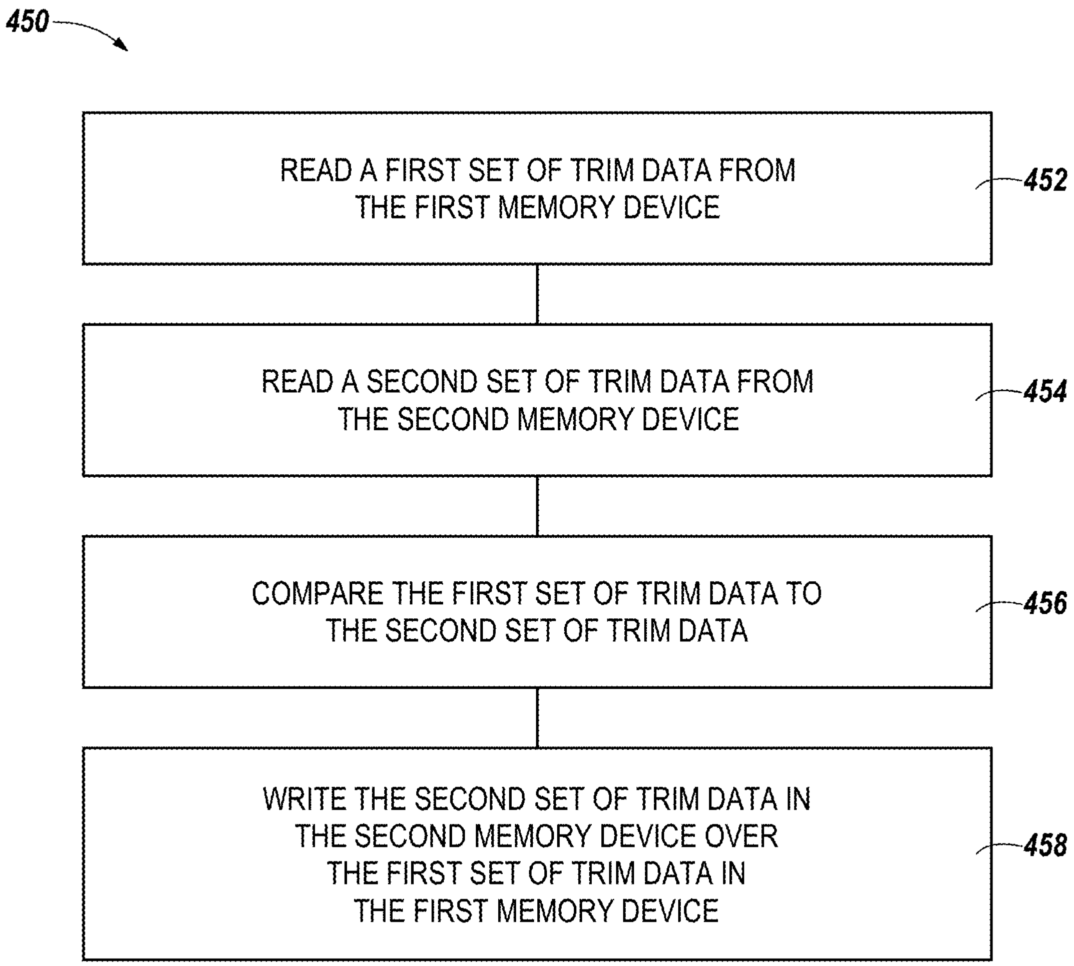
FIG. 4 is a flow diagram of an example method for tracking latch upset events using a trim register in accordance with some embodiments of the present disclosure.

FIG. 4 is a flow diagram of an example method 450 corresponding to tracking latch upset events using a trim register in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 can be performed by the memory sub-system controller 115 and 215 of FIGS. 1-2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, the method 450 includes reading a first set of trim data from a first memory device. The first memory device can be a non-volatile memory device that is analogous to the non-volatile memory (NVM) device 130 and 230 in FIGS. 1-2. The first memory device can include trim registers configured to store trim data. At operation 454, the method 450 includes reading a second set of trim from a second memory device. The second memory device can be a OTP memory. The OTP memory can be analogous to the OTP memory device 113 and 213 in FIGS. 1-2.

At operation 456, the method 450 includes comparing the first set of trim data to the second set of trim data. In some examples, the controller can cause the setting of a flag to indicate an occurrence of a neutron strike in response to the first set of trim data being different than the second set of trim data. The setting of a flag can refer to a bit of data being changed to indicate that a neutron strike has occurred. The flag can be accessible by a user of the data, a system monitoring the data, etc. In response to detecting a set flag, additional measures can be taken to correct the neutron strike occurrence or to determine that a grouping of neutron strikes or a pattern of neutron strikes may be caused by a specific event or series of events that may need to be addressed. Conversely, an absence of a neutron strike on the non-volatile memory can be determined responsive to the first set of trim data matching the second set of trim data. Further, in some examples, the trim data can be determined to be invalid trim data in response to the first set of trim data being different than the second set of trim data. In some examples, the first set of trim data can be maintained (e.g., not changed, not written over) in response to the first set of trim data matching the second set of trim data.

At operation 458, the method 450 includes writing the second set of trim data in the second memory device over the first set of trim data in the first memory device. For instance, the second set of trim data can be written over the first set of trim data in response to the first set of trim data being different than the second set of trim data, based on the comparison at 456.

Figure 5:
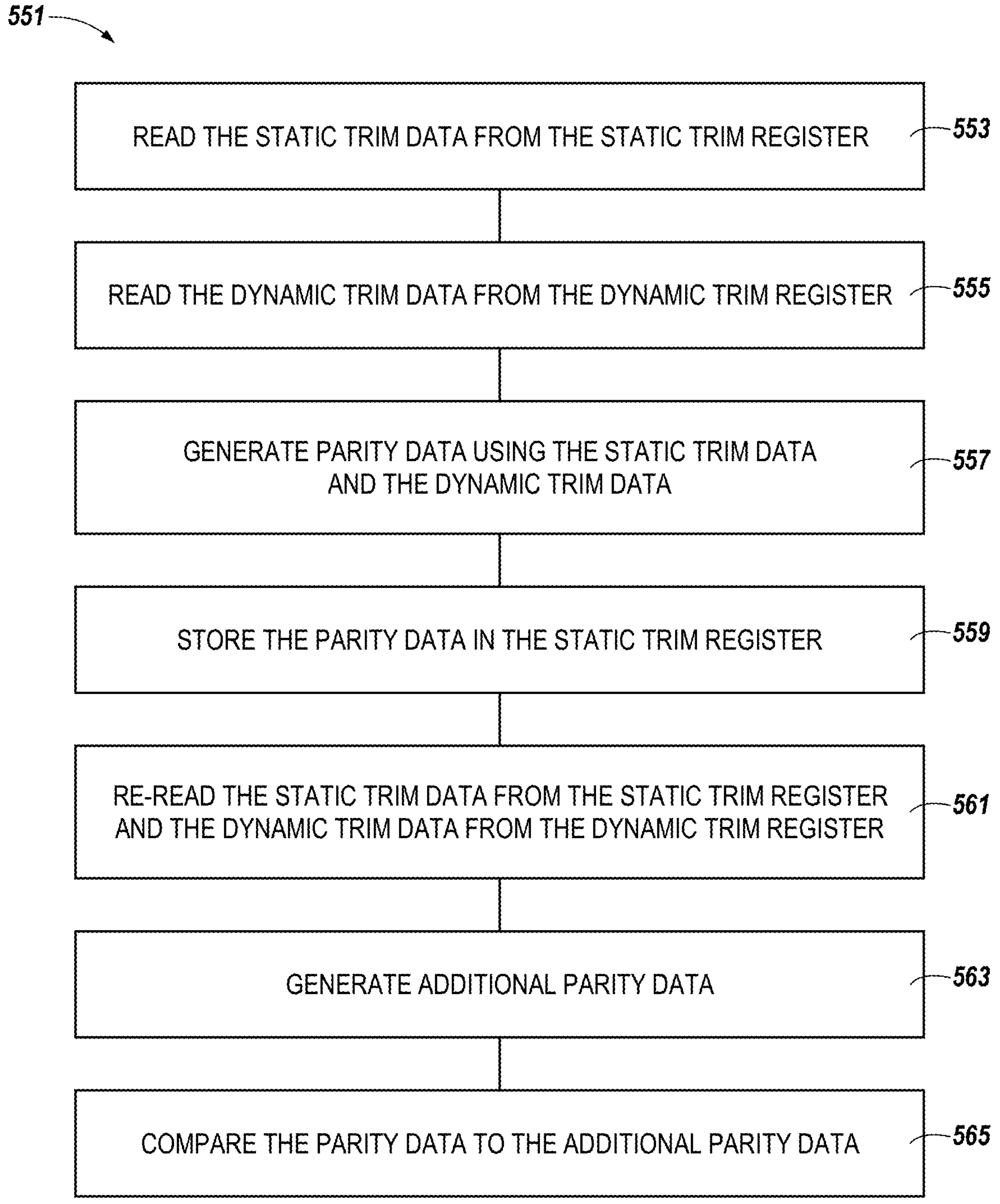
FIG. 5 is a flow diagram of an example method for tracking latch upset events using a trim register in accordance with some embodiments of the present disclosure.

FIG. 5 is a flow diagram of an example method 551 corresponding to tracking latch upset events using a trim register in accordance with some embodiments of the present disclosure. The method 551 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 551 can be performed by the memory sub-system controller 115 and 215 of FIGS. 1-2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 553, the method 551 includes reading static trim data from a static trim register. A static trim register refers to a trim register that is not changed over time (e.g., not dynamically changed). At operation 555, the method 551 includes reading dynamic trim data from a dynamic trim register. A dynamic trim register refers to a trim register that is changed over time (e.g., dynamically changed) in response to an environment changing or as data is read or written in different portions of the memory. For example, the dynamic trim register can store dynamic trim data that is changed as the memory system performs memory operations over time. While a single trim register is illustrated in FIGS. 1-2, e.g., trim register 132 and 232, examples are not so limited. The trim register can be split into a static trim register and a dynamic trim register in order to store the static trim data and the dynamic trim data, respectively.

At operation 557, the method 551 includes generating parity data using the static trim data and the dynamic trim data. The parity data can be used to protect both the static trim data and the dynamic trim data and provide for more broad coverage of protection of the trim data. At operation 559, the method 551 includes storing the parity data in the static trim register. At operation 561, the method 551 includes re-reading the static trim data from the static trim register and the dynamic trim data from the dynamic trim register. The static and dynamic trim data can be re-read at a point in time or time period later than when the initial static trim data and dynamic trim data was initially read to generate the parity data. As an example, the static trim data and dynamic trim data can be read at a first time point and the initial parity can be generated from the static trim data and the dynamic trim data read at the first time point. The static trim data and the dynamic trim data can be re-read or read again at a second time point later than the first time point. Due to the dynamic trim data being changed over time, the parity data stored in the static trim register may be updated in response to the dynamic trim data changing.

At operation 563, the method 551 includes generating additional parity data. The additional parity data can be generated from the static trim data and the dynamic trim data re-read or read again at the second time point. At operation 565, the method 551 includes comparing the parity data to the additional parity data. As an example, parity data stored in the static trim register can be compared to additional parity data generated from reading the static trim data and the dynamic trim register again or at a later point in time. In this way, the parity data in the static trim register can be compared to the additional parity data to determine whether a latch upset event has occurred and/or determine whether to reload static trim data and/or dynamic trim data from a trusted location (e.g., from an OTP memory that stores trim data that may not change) or error correct the static trim data and/or the dynamic trim data, if possible.

In some examples, a determination can be made that the static trim data and the dynamic trim data are valid in response to the parity data matching the additional parity data. In some examples, a determination that at least one of the static trim data and the dynamic trim data is invalid can be made in response to the parity data being different than the additional parity data. In some examples, in response to the parity data being different than the additional parity data, a determination that a latch upset event has affected the static trim data and the dynamic trim data can be made. In response to the determination of the latch upset event, the static trim data in the static trim register and the dynamic trim data in the dynamic trim data in the dynamic trim register can be reinitialized. For example, the static trim data and the dynamic trim data can be error corrected and/or trusted trim data can be reloaded into the static trim register and the dynamic trim register. In some examples, the parity data can be updated in response to the dynamic trim data changing. In some examples, the dynamic trim data can be periodically checked to determine whether the dynamic trim data has changed.

Figure 6:
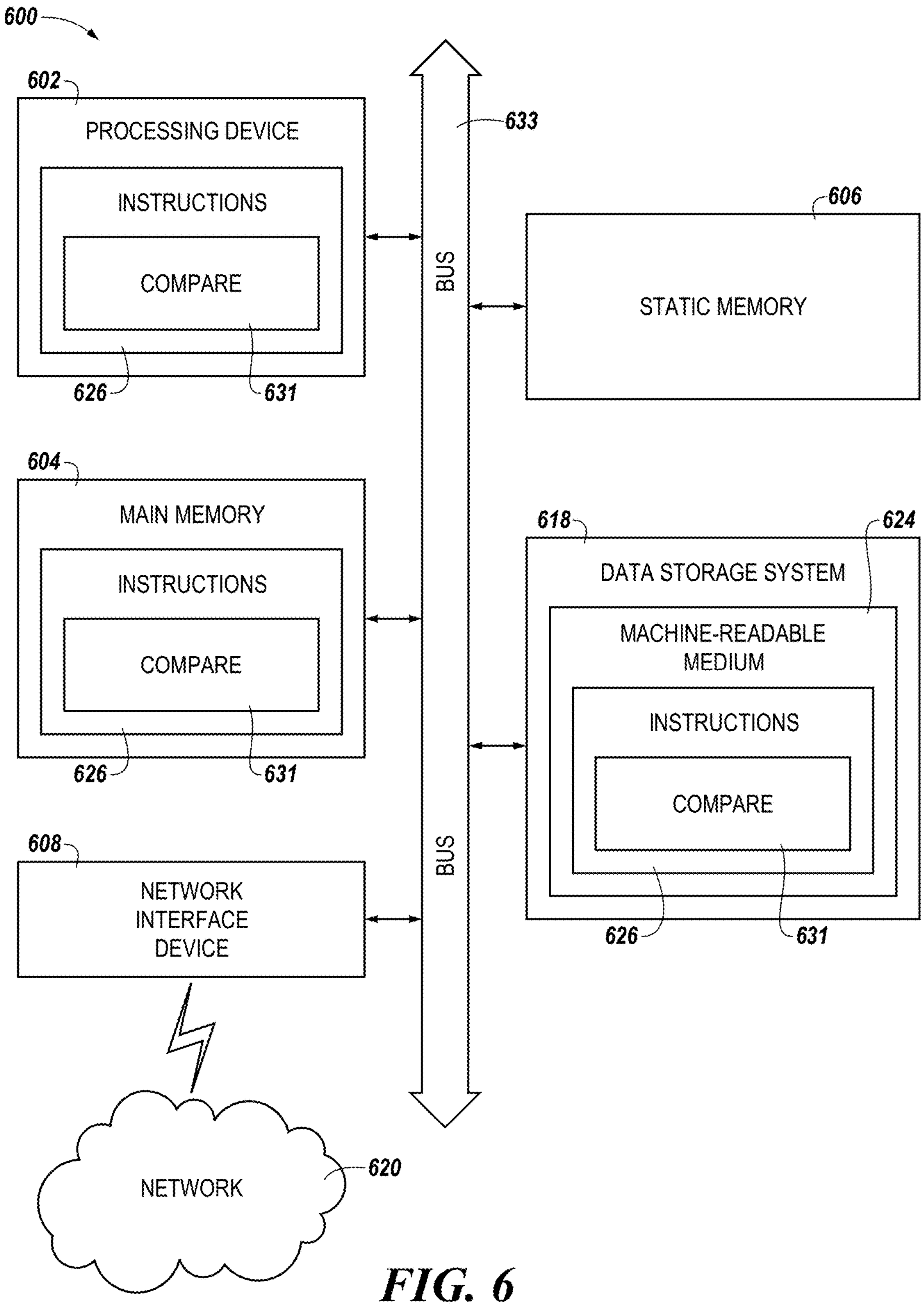
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to generate parity data or additional parity data) and of the compare component 631 (e.g., to compare parity data to additional parity data). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 633. The processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and stages discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality using data stored in the OTP memory device 613. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
- reading static trim data from a static trim register in a non-volatile memory device;
- reading dynamic trim data from a dynamic trim register in the non-volatile memory device;
- generating parity data for the static trim data and the dynamic trim data;
- storing the parity data in the static trim register; and
- subsequent to the generation and storage of the parity data:
  - re-reading the static trim data from the static trim register and the dynamic trim data from the dynamic trim register;
  - generating additional parity data;
  - comparing the parity data to the additional parity data; and
  - in response to the parity data matching the additional parity data, determining that the static trim data and the dynamic trim data are valid.

2. The method of claim 1, further comprising sending a set flag to an external device, wherein the set flag indicates a latch upset event has occurred in the static trim registers and the dynamic trim registers.

3. An apparatus, comprising:
- a first memory device comprising trim registers configured to store trim data;
- a second memory device coupled to the first memory device; and
- a controller coupled to the first memory device and the second memory device, the controller configured to:
  - read a first set of trim data from the first memory device;
  - read a second set of trim data from the second memory device;
  - compare the first set of trim data to the second set of trim data; and
  - in response to the first set of trim data being different than the second set of trim data, write the second set of trim data in the second memory device over the first set of trim data in the first memory device.

4. The apparatus of claim 3, wherein the first memory device is a non-volatile memory device and the second memory device is a one-time programmable (OTP) memory device.

5. The apparatus of claim 3, wherein the controller is configured to, in response to the first set of trim data being different than the second set of trim data, determine that a latch upset event has occurred in the trim registers.

6. The apparatus of claim 5, wherein the controller is configured to, in response to determining that the latch upset event has occurred in the trim registers, set a flag indicating occurrence of a neutron strike.

7. The apparatus of claim 5, wherein the controller is configured to determine that a neutron strike on the first set of trim data has occurred in response to determining that the latch upset event has occurred.

8. The apparatus of claim 3, wherein the controller is configured to, in response to the first set of trim data being different than the second set of trim data, determine that the trim data is invalid trim data.

9. The apparatus of claim 3, wherein the controller is configured to, in response to the first set of trim data matching the second set of trim data, maintaining the first set of trim data as is.

10. The apparatus of claim 3, wherein the controller is configured to, in response to the first set of trim data matching the second set of trim data, determining an absence of a neutron strike on the trim registers.

11. An apparatus, comprising:
- a memory device comprising:
  - a static trim register configured to store static trim data; and
  - a dynamic trim register configured to store dynamic trim data; and
- a controller coupled to the memory device and configured to:
  - read the static trim data from the static trim register;
  - read the dynamic trim data from the dynamic trim register;
  - generate parity data using the static trim data and the dynamic trim data;
  - store the parity data in the static trim register; and
  - subsequent to the generation and storage of the parity data:
    - re-read the static trim data from the static trim register and the dynamic trim data from the dynamic trim register;
    - generate additional parity data; and
    - compare the parity data to the additional parity data.

12. The apparatus of claim 11, wherein the controller is configured to, in response to the parity data matching the additional parity data, determine that the static trim data and the dynamic trim data are valid.

13. The apparatus of claim 11, wherein the controller is configured to, in response to the parity data being different than the additional parity data, determine that at least one of the static trim data and the dynamic trim data is invalid.

14. The apparatus of claim 11, wherein the controller is configured to, in response to the parity data being different than the additional parity data:

determine that a latch upset event has affected the static trim data and the dynamic trim data; and re-initialize the static trim data in the static trim register and the dynamic trim data in the dynamic trim register.

15. The apparatus of claim 11, wherein the controller is configured to update the parity data in response to the dynamic trim data changing.

16. The apparatus of claim 15, wherein the controller is configured to periodically check the dynamic trim data to determine whether the dynamic trim data has changed.

* * * * *